United States Patent [19]

Zaitsu et al.

[11] 4,305,993
[45] Dec. 15, 1981

[54] MAGNETIC RECORDING MEDIUM

[75] Inventors: Hiroshi Zaitsu; Shigeyuki Hosoo, both of Osaka, Japan

[73] Assignee: Hitachi Maxell, Ltd., Osaka, Japan

[21] Appl. No.: 194,858

[22] Filed: Oct. 7, 1980

[30] Foreign Application Priority Data

Oct. 9, 1979 [JP] Japan .................. 54/130537
Oct. 9, 1979 [JP] Japan .................. 54/130538

[51] Int. Cl.$^3$ .............................. G11B 5/68
[52] U.S. Cl. .................... 428/328; 106/37;
252/62.54; 252/62.55; 360/134; 360/135;
360/136; 427/128; 427/132; 427/216; 428/403;
428/407; 428/694; 428/695; 428/900
[58] Field of Search .......... 428/900, 328, 694, 695,
428/425.9, 403, 407; 427/127, 128, 132, 216;
106/37, 311, 308 F, 309; 252/62.54, 62.55;
360/135, 134, 136

[56] References Cited

U.S. PATENT DOCUMENTS

| 3,029,157 | 4/1962 | Sutheim et al. ............ 428/900 |
| 3,956,562 | 5/1976 | Shibata et al. ............ 428/900 |
| 4,087,582 | 5/1978 | Shizabata et al. ......... 428/900 |
| 4,091,143 | 5/1978 | Hartmann et al. ......... 428/900 |
| 4,197,357 | 4/1980 | Huisman .................... 428/900 |

FOREIGN PATENT DOCUMENTS 53-37001 of 1978 Japan .................... 428/900
54-150104 of 1979 Japan .................... 428/900

Primary Examiner—Stanley S. Silverman
Attorney, Agent, or Firm—Birch, Stewart, Kolasch and Birch

[57] ABSTRACT

A magnetic recording medium which comprises a base material and a magnetic layer provided on its surface, said magnetic layer comprising metallic magnetic particles, a binder and a salt of lanolin fatty acid wherein the oxidation resistance of the metallic magnetic particles is highly improved and the metallic magnetic particles are in a good dispersion state so that the magnetic recording medium shows an increased maximum magnetic flux density is disclosed.

10 Claims, 2 Drawing Figures

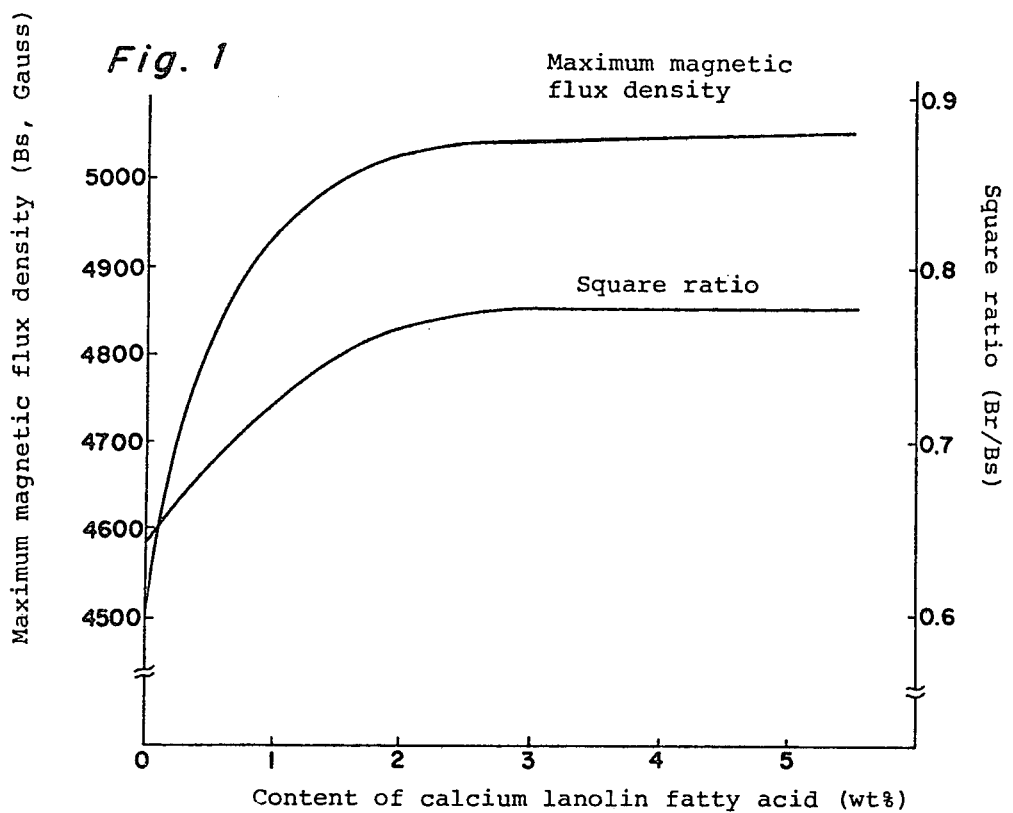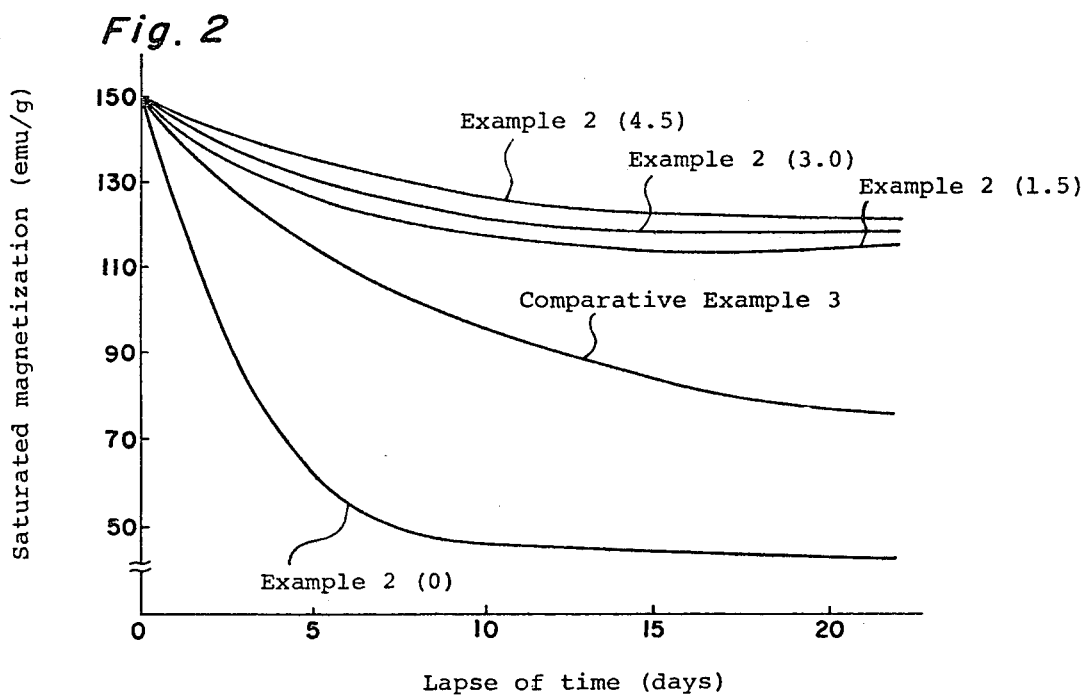

MAGNETIC RECORDING MEDIUM

BACKGROUND OF THE INVENTION

The present invention relates to an improvement in a magnetic recording medium such as a magnetic recording tape or a magnetic recording disc using metallic particles as magnetic particles for the magnetic layer.

The purpose of this invention is to provide a magnetic recording medium having a magnetic layer comprising metallic magnetic particles of high oxidation resistance in a good dispersion state.

Metallic magnetic particles such as metallic iron particles are generally obtainable by reducing metallic oxide particles while heating and, in comparison with metallic oxide magnetic particles, have excellent magnetic performances such as high coercive force (Hc). Thus, the development of a magnetic recording medium using metallic magnetic particles as the magnetic recording element in the future is highly expected. Since, however, metallic magnetic particles are apt to be readily oxidized, they are oxidized with oxygen in the air even in a state being contained in a magnetic layer. With the progress of the oxidation, the magnetic characteristics of the magnetic recording medium such as maximum magnetic flux density (Bs) are lowered, whereby a problem is caused on the stability of the magnetic performances on the storage as well as the use. Further, in comparison with metallic oxide magnetic particles, metallic magnetic particles are apt to cause cohesion on preparation of a magnetic coating composition therewith so that their good dispersion state in the magnetic layer is hardly achieved. Thus, excellent electro-magnetic transducing characteristics such as high sensitivity and high S/N ratio, which are required for a magnetic recording medium, can not be obtained.

In order to overcome the above disadvantages present in the metallic magnetic particles, attempts have been made to improve the oxidation resistance and dispersion state of the magnetic layer by incorporating appropriate additives such as surfactants (e.g. sodium stearate) into the magnetic coating composition. However, these attempts have not produced a satisfactory result.

SUMMARY OF THE INVENTION

As the result of an extensive study, it has now been found that the existence of a salt of lanolin fatty acid in the magnetic layer can improve markedly the oxidation resistance of the metallic magnetic particles. It has also been found that the presence of the salt in the magnetic coating composition can assure an excellent flowing property of such composition and a high packing property and a good dispersion state of the metallic magnetic particles in the magnetic layer formed by the use of such a composition. Advantageously, the resulting magnetic recording medium shows increased maximum magnetic flux density (Bs). This invention is based on the above findings.

DETAILED DESCRIPTION OF THE INVENTION

According to the present invention, there is provided a magnetic recording medium which comprises a base material and a magnetic layer provided on the surface of the base material, said magnetic layer comprising metallic magnetic particles, a binder and a salt of lanolin fatty acid.

As the base material, there may be, for instance, a polyester film, an acetylcellulose film, a polyamide film or a polyimide film. When the magnetic recording medium is a magnetic recording tape, the use of a polyester film having a thickness of 5 to 100$\mu$ as the base material is particularly preferable.

The metallic magnetic particles may be, for instance, particles of iron, cobalt, nickel, etc. Particles of their alloys are also usable. Among them, iron is the most preferred due to its high maximum magnetic flux density. For increasing the corrosion resistance, the said metal particles may be admixed with particles of cobalt, chromium, nickel or the like, usually in an amount of not more than 5% by weight on the weight of the metal particles as the main component. Further, those particles may be provided with an oxidized film on their surfaces by any appropriate procedure for enhancing their oxidation resistance.

The binder may be any conventional one, of which specific examples are vinyl chloride-vinyl acetate copolymer, polyvinyl butyral, polyurethane resin, nitrocellulose, polyester resin, etc.

Lanolin fatty acid is a fatty acid obtained from sheep's-wool wax as the starting material and, like beef tallow fatty acid, contains various fatty acid components. Its salt is characteristic in being highly soluble in organic solvents such as toluene and xylene. Because of this characteristic property, the salt of lanolin fatty acid may be first dissolved in an appropriate organic solvent such as toluene, and the resultant solution may be admixed with other components such as the metallic magnetic particles and the binder to make a magnetic coating composition. Alternatively, the metallic magnetic particles may be dipped in the said solution to obtain the particles coated by the salt of the lanolin fatty acid, and such coated particles may be used for preparation of a magnetic coating composition. This procedure is particularly favorable, because each particle is coated evenly and tightly with the salt of lanolin fatty acid on its surface.

Examples of the salt of lanolin fatty acid are sodium salt, potassium salt, calcium salt, barium salt, etc., among which the calcium salt is the most preferred. For coating a salt of lanolin fatty acid onto the surfaces of the metallic magnetic particles, there may be adopted various procedures, of which a typical one comprises dispersing the metallic magnetic particles into a solution of a salt of lanolin fatty acid in an appropriate organic solvent and collecting the coated particles. Another typical one comprises dispersing the metallic magnetic particles into a solution of a salt of lanolin fatty acid in an appropriate organic solvent, introducing an oxygen-containing gas into the dispersion and collecting the coated particles.

For preparation of the magnetic recording medium, there may be employed any conventional method using a magnetic coating composition comprising the salt of lanolin fatty acid. For example, a magnetic coating composition is prepared by mixing the metallic magnetic particles, the binder and the salt of lanolin fatty acid, optionally with any other additive, in a suitable organic solvent (e.g. toluene, xylene, methyl isobutyl ketone, methyl ethyl ketone, cyclohexanol, tetrahydrofuran, ethyl acetate). Alternatively, the salt of lanolin fatty acid may be previously coated on the surfaces of the metallic magnetic particles by the procedure as stated above. Examples of the other additives are dispersing agents (e.g. lecithin), lubricants (e.g. lauric acid, liquid paraffin), plasticizers (e.g. dioctyl phthalate, dibutyl phthalate), etc. The magnetic coating composition thus prepared is applied to a base material by a conventional means such as a roll coater (e.g. gravure coater, reverse coater), a blade coater or an air knife coater, followed by drying. The thickness of the magnetic layer after drying is usually from 2 to 20$\mu$.

The magnetic recording medium thus prepared has a magnetic layer, which contains usually the metallic magnetic particles in an amount of 60 to 85% by weight on the basis of the magnetic layer and the salt of lanolin fatty acid in an amount of 0.7 to 5% by weight on the basis of the weight of the metallic magnetic particles. When the amount of the salt of lanolin fatty acid is smaller, the effect for improvement of oxidation resistance and enhancement of a dispersibility is insufficient. When the amount is larger, there may be produced bleeding out or sticking on the magnetic layer.

PREFERRED EMBODIMENTS

Practical and presently preferred embodiments of the invention are illustratively shown in the following Examples wherein part(s) and % are by weight. Calcium salt of lanolin fatty acid used in these Examples has the following composition: $(CH_3(CH_2)_{8-30}COO)_2Ca$, 7%; $((CH_3)_2CH(CH_2)_{6-28}COO)_2Ca$, 23%; $(CH_3CH_2(CH_3)CH(CH_2)_{5-27}COO)_2Ca$, 30%; $(CH_3(CH_2)_{7-29}CH(OH)COO)_2Ca$, 35%; Ca salts of other fatty acids, 5%.

EXAMPLE 1

Magnetic particles (metallic iron particles; average size (long axis), 0.4 micron) (70 parts), calcium salt of lanolin fatty acid (1.05 parts), a mixture of vinyl chloride/vinyl acetate/vinyl alcohol terpolymer ("VAGH" manufactured by Union Carbide Corp.), polyurethane pre-polymer ("Takelac E-550" manufactured by Takeda Chemical Ind. Ltd.) and trifunctional polyisocyanate ("Colonate L" manufactured by Nippon Polyurethane Ind. Co., Ltd.) in a weight proportion of 20:7:3) (20 parts) as a binder, carbon black (1.4 parts), liquid paraffin (0.5 part) and a mixture of methyl isobutyl ketone and toluene (1:1) (100 parts) as a solvent were mixed together in a kneader for 4 hours, the binder mixture (10 parts) and the solvent mixture (100 parts) were added thereto, and the resultant material were mixed together in a ball mill for 72 hours to make a magnetic coating composition.

The magnetic coating composition was applied onto the surface of a polyester film of 12 microns in thickness by the aid of a gravure coater, followed by drying to make a magnetic layer. The resulting film was calendered at a roll temperature of 80° C. under a pressure of 80 kg/cm$^2$ with a speed of 10 m/minute and cut to give a magnetic recording tape having a magnetic layer of 4 microns in thickness and a width of ¼ inch. The content of calcium salt of lanolin fatty acid in the magnetic layer was 1.5 parts to 100 parts of the magnetic particles.

EXAMPLE 2

The magnetic particles as in Example 1 (70 parts), a certain amount of calcium salt of lanolin fatty acid and toluene (500 parts) were mixed together in a homomixer at 60° C. for 2 hours, followed by filtration and drying under reduced pressure. The resulting coated magnetic particles were mixed together with the binder mixture as in Example 1 (20 parts), carbon black (1.4 parts), liquid paraffin (0.5 part) and the solvent mixture as in Example 1 (100 parts) in a kneader for 3 hours. Then, the resulting materials were mixed together with the binder mixture (10 parts) and the solvent mixture (100 parts) in a ball mill for 72 hours to make a magnetic coating composition.

In the same manner as in Example 1, the magnetic coating composition was applied onto the surface of a polyester film to make a magnetic recording tape having a magnetic layer which comprises calcium salt of lanolin fatty acid in an amount of 0, 1.5, 3.0 or 4.5 parts to 100 parts of the magnetic particles.

COMPARATIVE EXAMPLE 1

In the same manner as in Example 1 but using sodium stearate (1.05 parts) in place of calcium salt of lanolin fatty acid, there was prepared a magnetic recording tape having a magnetic layer which comprises sodium stearate in an amount of 1.5 parts to 100 parts of the magnetic particles.

COMPARATIVE EXAMPLE 2

In the same manner as in Example 1 but not using calcium salt of lanolin fatty acid, there was prepared a magnetic recording tape having a magnetic layer which comprises no calcium salt of lanolin fatty acid.

COMPARATIVE EXAMPLE 3

In the same manner as in Example 2 but using sodium stearate (1.05 parts) in place of calcium salt of lanolin fatty acid, there was prepared a magnetic recording tape having a magnetic layer which comprises sodium stearate in an amount of 1.5 parts to 100 parts of the magnetic particles.

The magnetic recording tapes obtained in Examples 1 and 2 and Comparative Examples 1 to 3 were subjected to oxidation resistance test. The change of the maximum magnetic flux density (Bs) with elapse of the time was observed on each magnetic recording tape placed in corrosive atmosphere at 60° C. under a relative humidity of 90%. The square ratio (Br/Bs) was also measured for evaluation of the dispersing property. The results are shown in Table 1.

TABLE 1

| Example[*1] | Square ratio (Br/Bs) | Maximum magnetic flux density (Bs, Gauss) | | | | |
|---|---|---|---|---|---|---|
| | | Initial | After 5 days | After 10 days | After 15 days | After 20 days |
| 1 | 0.74 | 4900 | 4700 | 4500 | 4400 | 4400 |
| 2 (0) | 0.67 | 4500 | 4100 | 3800 | 3600 | 3400 |
| 2 (1.5) | 0.75 | 5000 | 4800 | 4600 | 4500 | 4500 |
| 2 (3.0) | 0.78 | 5000 | 4900 | 4700 | 4600 | 4600 |
| 2 (4.5) | 0.78 | 5000 | 4900 | 4700 | 4600 | 4600 |
| Comparative 1 | 0.69 | 4600 | 4300 | 4100 | 4000 | 3900 |
| Comparative 2 | 0.64 | 4500 | 4100 | 3800 | 3600 | 3400 |
| Comparative 3 | 0.71 | 4700 | 4400 | 4200 | 4100 | 4000 |

Note:
[*1]The number in parenthesis indicates the amount (parts by weight) of calcium salt of lanolin fatty acid to 100 parts by weight of the magnetic particles in the magnetic layer.

The relationship of the maximum magnetic flux density and the square ratio with the content of calcium lanolin fatty acid in the magnetic layer determined on the magnetic recording tapes obtained in Example 2 is shown in FIG. 1 of the accompanying drawings.

The change of the saturated magnetization ($\sigma_s$) with elapse of the time was observed on the coated magnetic particles obtained in Example 2 and Comparative Example 3 when placed in corrosive atmosphere at 60° C. under a relative humidity of 90%. The results are shown in FIG. 2 of the accompanying drawings.

From the above results, it is understood that the coated magnetic particles of the invention show excellent oxidation resistance and storage stability. When they are formulated into a magnetic coating composition, their dispersion and packing properties as well as the fluidity of the resulting composition are excellent. Thus, they can provide a magnetic recording medium having good magnetic characteristics and performances.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A magnetic recording medium which comprises a base material and a magnetic layer provided on its surface, said magnetic layer comprising metallic magnetic particles, a synthetic resin binder and a salt of lanolin fatty acid in an amount of 0.7 to 5% by weight on the basis of the weight of the metallic particles.

2. The magnetic recording medium according to claim 1, wherein the metallic magnetic particles comprise metallic iron as the main component.

3. The magnetic recording medium according to claim 1, wherein the salt of lanolin fatty acid is the calcium salt.

4. The magnetic recording medium according to claim 1, wherein the metallic magnetic particles are coated with the salt of lanolin fatty acid on the surfaces.

5. Coated particles useful for the preparation of a magnetic coating composition for magnetic recording media comprising synthetic resin binder and metallic magnetic particles comprising metallic magnetic particles the surfaces of which are coated with a salt of lanolin fatty acid in an amount of 0.7 to 5% by weight on the basis of the weight of the metallic particles.

6. The metallic magnetic particles according to claim 5, wherein the salt of lanolin fatty acid is the calcium salt.

7. A process for preparing the metallic magnetic particles according to claim 5, which comprises admixing metallic magnetic particles with a solution of a salt of lanolin fatty acid in an organic solvent.

8. The process according to claim 7, wherein the metallic magnetic particles comprise metallic iron as the main component.

9. The process according to claim 7, wherein the salt of lanolin fatty acid is the calcium salt.

10. The process according to claim 7, wherein the organic solvent is toluene.

* * * * *